Sept. 28, 1965  R. P. BOYLAN  3,209,086
INAUDIBLE TONE GENERATOR
Filed June 11, 1962
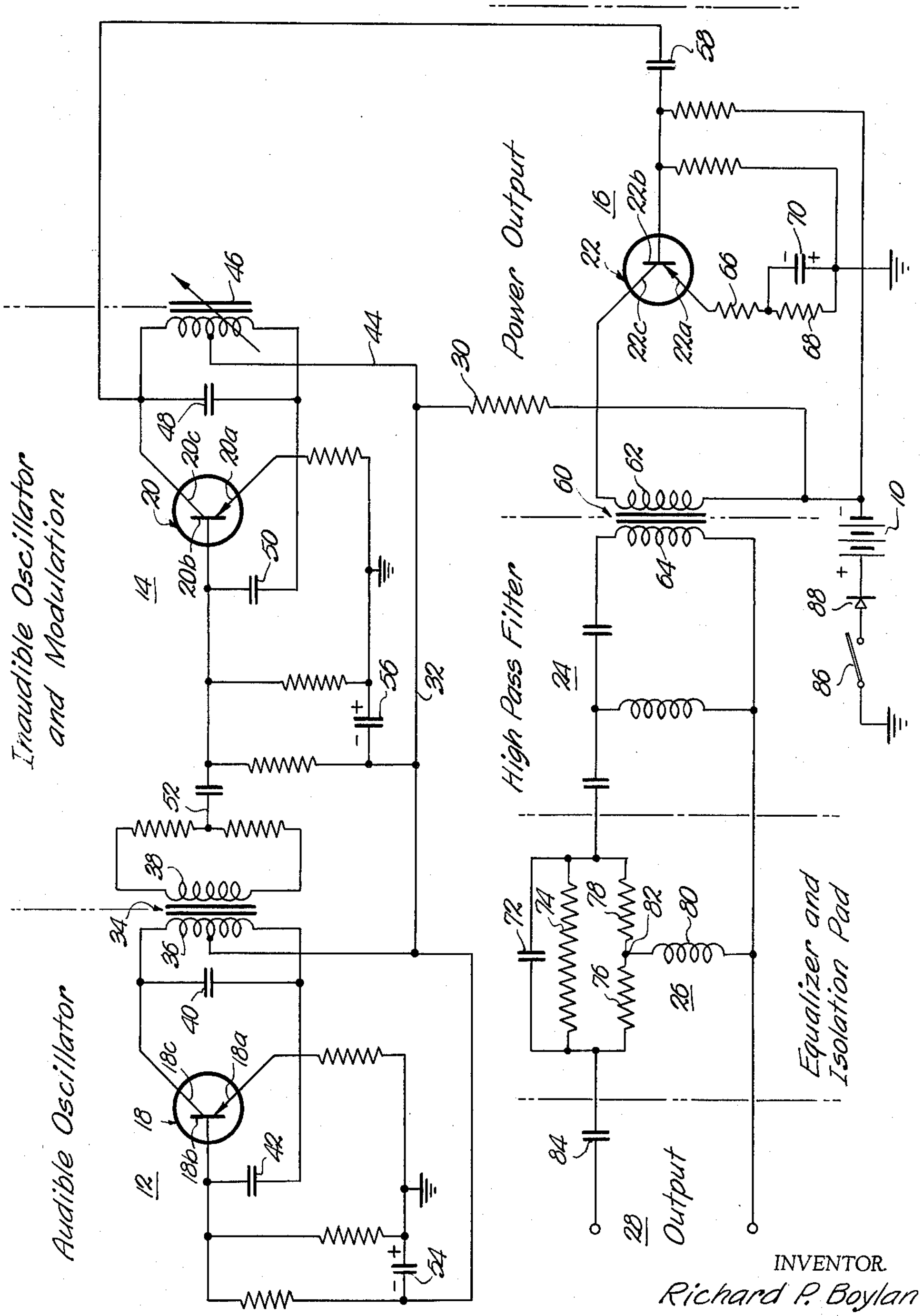
INVENTOR.
Richard P. Boylan
BY
Hovey, Schmidt, Johnson & Hovey
ATTORNEYS.

United States Patent Office 3,209,086

Patented Sept. 28, 1965

3,209,086

INAUDIBLE TONE GENERATOR

Richard P. Boylan, 5836 Wyandotte, Kansas City, Mo.

Filed June 11, 1962, Ser. No. 201,356
8 Claims. (Cl. 179—175)

This invention relates generally to inaudible tone generators and, more specifically, to a portable inaudible tone generator for use in the testing of telephone lines.

The testing of telephone lines and networks of such lines in various configurations is a never-ending task confronting the telephone companies that maintain the miles of telephone lines stretched over this country and others. When telephone service is interrupted for one reason or another, it is frequently necessary to trace a particular telephone line through multiconductor cables to the source of the difficulty.

Telephone cables often contain wires therein numbering in the hundreds. To facilitate the tracing of a particular telephone line an audio oscillator is commonly employed. Such an oscillator is interconnected with the line under test at one point thereon and the line is then intercepted at another point to ascertain whether continuity exists between the test points. This check may be accomplished by probing the telephone cable at the intercepting point until the signal from the audio oscillator is heard. Although insulated one from the other within the cable, the individual telephone lines are disposed in such close proximity to one another that sideline pick-up due to inductive and capacitive coupling makes it possible to receive the audio signal before the line over which it is actually transmitted is found at the interception point. Therefore, this sideline pick-up enables the lineman at the point of interception to locate the desired line by probing in the direction of increasing signal strength until the desired line is found. Direct contact with this line, of course, produces a substantial increase in signal level.

The above procedure, however, is not entirely satisfactory because the sideline pick-up can also be heard by telephone subscribers who happen to be connected to such a sideline. It is not uncommon for the telephone subscriber to interpret this pick-up as being an indication that there is difficulty on his telephone line or that his telephone is perhaps out of order or failing. The reporting of such spurious line difficulties to the telephone company may result in considerable confusion plus the inconvenience to both the telephone company and the subscriber.

Another difficulty often found with the test equipment in present use is that the equipment is of such weight and bulk as to not be easily portable from one test location to another. This means that the equipment must be carried on service trucks or other vehicles when it is desired to transport it over substantial distances.

It is therefore an object of this invention to provide a means of overcoming the difficulties discussed above.

It is another object of this invention to provide a lightweight, compact, portable inaudible tone generator.

It is still another object of this invention to provide a portable telephone line test apparatus that will generate an inaudible carrier signal modulated by an audible signal so that sideline pick-up will be audible only after demodulation.

It is still another object of this invention to provide such apparatus operable from a portable source of direct current.

It is still another object of this invention to provide a lightweight, compact telephone line test apparatus capable of generating the output power required for practical utilization thereof at inaudible output frequencies.

Other objects will become apparent as the detailed description proceeds.

In the accompanying drawing:

The figure is a schematic diagram of the present invention.

In the design of apparatus to implement the aforesaid objects, the problem of providing a portable unit having sufficient power output is encountered. If an inaudible carrier frequency is to be used, it is necessary that a frequency of approximately 15,000 cycles per second be chosen. The characteristics of telephone lines, however, are such that a signal of this frequency is severely attenuated when an attempt is made to propagate the signal along the telephone line. This may be accomplished by a suitable equalizer network that extends the frequency response of the telephone line. However, this does not prevent serious attenuation in the sidelines.

To combat the inherent sideline attenuation at the inaudible frequencies a signal of high power output must be used so that such attenuation will be offset. Without sideline pick-up, of course, detection of the signal at the intercepting point in the telephone line is extremely difficult and time-consuming as no indication of the presence of the signal is received until the telephone line under test is contacted directly by the probe. It has been found that the power output of an inaudible tone generator must be at least approximately one-half watt in order to induce the requisite sideline signals.

It is obvious that higher power output necessitates the use of a power source of greater size which, in turn, detracts from the portability of the testing device. Furthermore, a portable power source is impractical unless the source can operate for a reasonable length of time without requiring replacement or other maintenance. Also, such a source must be practical from the standpoint of cost, notwithstanding any attributes of portability.

In providing a solution to the aforesaid problems the present invention comprises structure as shown in the figure wherein a D.C. power source 10 powers an audible frequency oscillator stage 12, an inaudible frequency oscillator and modulation stage 14 and a power output stage 16. Stages 12, 14 and 16 employ transistors 18, 20 and 22, respectively, as the active elements thereof. Transistor 18 has an emitter 18*a*, a base 18*b*, and a collector 18*c*, and transistors 20 and 22 have identical configurations designated in like manner. The power output stage 16 is coupled to a high pass filter stage 24 and an equalizer and isolation pad stage 26. An output 28 comprising a pair of connection points is provided for connecting the apparatus to the telephone line under test.

The bias circuitry of stage 12 is connected to source 10 through a dropping resistor 30 and lead 32. The stage is an adaptation of the Hartley type oscillator. A transformer 34 having a center tapped primary 36 and a secondary winding 38 is utilized in the output circuit to isolate stage 12 from stage 14 and to provide impedance matching between the stages to facilitate coupling of the output of stage 12 to the input of stage 14. Furthermore, the center tapped primary 36 serves as the inductive portion of the oscillator resonant circuit. The resonant circuit is completed by capacitor 40 and feedback is obtained through capacitor 42. The capacitance of capacitor 40 and the inductance of the center tapped primary 36 may be chosen to match the output impedance of transistor 18 and to provide a resonant circuit of appropriate frequency. An oscillator frequency of approximately 500 cycles per second is suggested.

The inaudible frequency oscillator and modulation stage 14 is powered by source 10 through dropping resistor 30 and leads 32 and 44. This stage is also an adaptation of the Hartley type oscillator, a center tap variable inductance 46 and a capacitor 48 forming the resonant circuit of the oscillator. Inductance 46 is preferably variable from 1 to 5 millihenrys, and the value of capacitor 48 corresponding to this range is 0.025 microfarad.

A capacitor 50 provides the necessary feedback in stage 14 to sustain oscillation. If stage 14 was disconnected from stage 12 as by breaking the interstage coupling circuit as at point 52, stage 14 would oscillate at the frequency determined by the setting of inductance 46. This oscillation frequency must be sufficiently high to be inaudible. Therefore, a frequency of approximately 15,000 cycles per second is suggested but higher frequencies may be used if desired. It should be noted however that the higher the frequency the more difficult it is to match said frequency to a telephone line without high insertion losses in the coupling stages. Therefore, 15,000 cycles per second is suggested so that maximum efficiency of power transfer may be obtained.

Assuming a 500-cycle-per-second output signal from stage 12, transistor 20 is base modulated by the output of stage 12. Assuming a stage 14 oscillation frequency of 15,000 cycles per second, the output of stage 14 would thus comprise a 15,000 c.p.s. carrier modulated by a 500 c.p.s. signal. Note that capacitors 54 and 56 are provided in the base bias circuitry of stages 12 and 14 respectively to prevent feedback from stage 14 to stage 12 due to the common power source 10.

The output of stage 14 is coupled to the input of the power output stage 16 by means of coupling capacitor 58. Stage 16 is a common emitter configuration operated class A for maximum efficiency. Class B operation is also possible, but such operation results in higher current requirements for a given output power. It should be appreciated that if a practical portable device is to be achieved, the current drain on source 10 must be maintained at a minimum for a given power output.

The output of stage 16 is coupled to the high pass filter stage 24 by a matching transformer 60 having a primary winding 62 and a secondary winding 64. The impedance of the secondary winding 64 is selected to equal the rated impedance value of the telephone lines to be tested. This is commonly 600 ohms.

Due to the inductive load placed on transistor 22 by transformer 60, a stability problem results if adequate precautions are not taken. Accordingly, resistances 66 and 68 are connected to the emitter **22*a* of transistor 22. Resistance 68 is by-passed by capacitor 70 to provide a substantially unattenuated A.C. path around resistance 68. Resistances 66 and 68 form a part of the bias circuitry and stabilize the collector current of transistor 22 to prevent thermal runaway. Resistance 66 serves to stabilize the A.C. signal voltage by providing enough degeneration of the signal to further inhibit thermal runaway. Since resistance 66** is, of course, not by-passed, its value should be maintained as low as possible so that its presence will not reduce the gain of the stage any more than is necessary.

The high pass filter stage 24 is provided to prevent other signals on the telephone line under test or spurious noise from feeding back into the power output stage 16. Noise is especially a serious problem due to the inductive and capacitive loading effects inherent in telephone lines. The parameters of filter 24 should be chosen to provide a cutoff frequency around 9,000 c.p.s. Most all disturbances on the telephone line are of a frequency considerably below this value. It should be appreciated that the filter stage 24 is operable if placed between the equalizer and isolation pad stage 26 and the output 28 as well as in the position shown in the figure.

The equalizer and isolation pad stage 26 is a combination of two T-bridges. Stage 26 performs the dual function of extending the frequency response of the telephone line to include the frequency of the carrier signal and of maintaining the impedance of the telephone line at its rated impedance value. The former function is necessary as the frequency response of a telephone line drops off sharply above 2,000 c.p.s. so that without an equalizer, a carrier on the order of 15,000 c.p.s. would be severely attenuated. The latter function is necessary as the impedance of a telephone line may vary considerably from its rated value due to the presence of moisture in the cable and other factors.

The doubleT-bridge that forms stage 26 comprises a capacitor 72 connected in parallel with a resistance 74, series connected resistances 76 and 78, and an inductance 80. The parallel connected combination of capacitor 72 and resistance 74 is connected in parallel across resistances 76 and 78. One lead from inductance 80 is connected at junction point 82 between the series connected resistors 76 and 78 thus forming the double T-bridge. For a carrier frequency of approximately 15,000 c.p.s. and a telephone line of a rated impedance of 600 ohms, representative values for the parameters of stage 26 are as follows:

| | |
|---|---|
| Capacitor **72** | 0.1 microfarad. |
| Resistance **74** | 1,300 ohms. |
| Resistances **76** and **78** | 620 ohms. |
| Inductance **80** | 10 millihenrys. |

With these values an insertion loss of approximately 6 db occurs in the isolation pad portion of the bridge. Therefore, it is important that the inductance 80 have a very high Q to hold said insertion loss at a minimum. Toroid inductors are preferred for this purpose, both in stage 26 and in stage 24.

In the output 28 of the apparatus, a blocking capacitor 84 is provided to prevent the line voltage on the telephone line under test from entering the circuitry of the testing apparatus. This makes the tester usable for the testing of live telephone lines as well as those in which the line voltage has been disconnected therefrom.

Transistors 18, 20 and 22 may, in general, be selected from a number of transistors suitable for audio frequency applications. Transistors 18 and 20 may have very low power output capabilities as the output from stage 14 need be no greater than that necessary to drive the power output stage 16 to an output of approximately ½ watt. Overdriving stage 16 should be avoided as such only increases the current drain on source 10. Transistor 22, of course, must be capable of providing an output power of at least approximately ½ watt with a collector dissipation rating appropriate for this requirement. For example, 2N456A or 2N457A type transistor may be used for transistor 22, and a 2N1379 transistor may be used for transistors 18 and 20. Using these components, the drain on source 10 during operation is approximately 60 to 70 milliamperes with a power output of approximately ½ watt.

An on-off switch 86 is utilized to open or close the power circuit to the apparatus as desired by the tester operator. A protective diode 88 is also inserted in the power circuit to prevent damage to the apparatus in case the polarities of the D.C. source 10 should inadvertently be reversed. Such a mishap could occur when the apparatus is operated from a battery source if care is not taken to insure that the batteries are properly connected when replaced.

Having thus described the invention what is claimed as new and desired to be secured by Letters Patent is:

1. Portable apparatus for testing a telephone line having a predetermined rated impedance at the audio frequencies normally used for voice communication, without interfering with such normal audio frequency use thereof, said apparatus comprising:

a portable source of direct current;

a pair of connection points adapted to be coupled with said line under test;

first transistorized means powered by said source for generating a carrier signal of an inaudible frequency substantially greater than said audio frequencies normally used for voice communication;

second transistorized means powered by said source and coupled with said first means for modulating said carrier signal with an audio frequency modulating signal;

electrical means including circuit means for extending the frequency response of said line under test to include the frequency of said carrier signal and for maintaining the impedance of said line at said rated value when the line is coupled with said connection points, said electrical means further including a high-pass filter coupled with said circuit means for attenuating noise on said line when the latter is coupled with said connection points;

impedance matching means coupling the output of said second transistorized means with said electrical means; and coupling means interconnecting said electrical means with said connection points.

2. Apparatus as set forth in claim 1, wherein said second transistorized means includes means for amplitude modulating said carrier signal with said modulating signal.

3. Apparatus as set forth in claim 1, wherein said impedance matching means comprises a transformer.

4. Apparatus as set forth in claim 1, wherein said second transistorized means includes a class A output amplifier stage comprising a common emitter, emitter resistor stabilized transistor with said emitter resistor substantially by-passed by a capacitor having negligible reactance at the carrier frequency.

5. Apparatus as set forth in claim 1, wherein said first transistorized means includes means for generating said carrier signal of a frequency of at least approximately 15,000 cycles per second.

6. Apparatus as set forth in claim 1, wherein said high pass filter comprises means permitting electrical signals of a frequency above approximately 9,000 cycles per second to pass therethrough substantially unattenuated.

7. Apparatus as set forth in claim 1, wherein said portable source of direct current is a single source.

8. Portable apparatus for testing a telephone line having a predetermined rated impedance at the audio frequencies normally used for voice communication, without interfering with such normal audio frequency use thereof, said apparatus comprising:

a portable source of direct current;

a pair of connection points adapted to be coupled with said line under test;

a transistor oscillator stage powered by said source for generating a carrier signal having a frequency of at least approximately 15,000 cycles per second;

a transistor modulator stage powered by said source and electrically coupled with said oscillator stage for amplitude modulating said carrier signal with a modulating signal having a frequency within the range of said audio frequencies normally used for voice communication to produce an amplitude modulated signal;

a class A amplifier stage electrically coupled with said modulator stage and responsive to said modulated signal, said amplifier stage being powered by said source and including a common emitter, emitter resistor stabilized transistor with said emitter resistor substantially by-passed by a capacitor having negligible reactance at the frequency of said carrier signal;

a high-pass filter for substantially attenuating noise on said telephone line under test of a frequency less than approximately 9,000 cycles per second when said line is coupled with said connection points;

a transformer having a pair of windings, one of said windings being coupled with the output of said amplifier stage, the other winding being coupled with said filter; and an equalizer and isolation pad operably intercoupling said filter with said connection points, said equalizer and isolation pad comprising a double T-bridge, including a high Q, inductive, shunt element, for extending the frequency response of said line under test to include the frequency of said carrier signal and for maintaining the impedance of said line at said rated value when the line is coupled with said connection points.

No references cited.

ROBERT H. ROSE, *Primary Examiner*.